US007536012B1

(12) United States Patent  
Meyers et al.

(10) Patent No.: US 7,536,012 B1  
(45) Date of Patent: May 19, 2009

(54) ENTANGLED QUANTUM COMMUNICATIONS AND QUANTUM IMAGING

(75) Inventors: Ronald E. Meyers, Columbia, MD (US); Keith S. Deacon, Columbia, MD (US); David L. Rosen, Rockville, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 871 days.

(21) Appl. No.: 10/900,351

(22) Filed: Jul. 28, 2004

Related U.S. Application Data (60) Provisional application No. 60/493,107, filed on Aug. 6, 2003.

(51) Int. Cl.
*H04L 9/00* (2006.01)
*H04L 9/12* (2006.01)

(52) U.S. Cl. ........................................ 380/44
(58) Field of Classification Search .................. 380/44
See application file for complete search history.

(56) References Cited

U.S. PATENT DOCUMENTS

| | | | |
|---|---|---|---|
| 5,515,438 A | 5/1996 | Bennett et al. | |
| 5,675,648 A | 10/1997 | Townsend | |
| 5,953,421 A * | 9/1999 | Townsend | 380/283 |
| 5,999,285 A * | 12/1999 | Brandt et al. | 398/212 |
| 6,272,224 B1 | 8/2001 | Mazourenko et al. | |
| 6,289,104 B1 * | 9/2001 | Patterson et al. | 380/283 |
| 6,424,665 B1 * | 7/2002 | Kwiat et al. | 372/21 |
| 6,444,999 B1 * | 9/2002 | Tomita | 257/14 |
| 6,748,083 B2 * | 6/2004 | Hughes et al. | 380/278 |
| 6,864,501 B2 * | 3/2005 | Shields et al. | 257/13 |
| 6,895,091 B1 | 5/2005 | Elliott et al. | |
| 7,197,523 B2 * | 3/2007 | Lutkenhaus et al. | 708/255 |
| 7,242,774 B1 * | 7/2007 | Elliott et al. | 380/256 |
| 7,317,574 B2 * | 1/2008 | Zoller et al. | 359/577 |
| 2001/0055389 A1 | 12/2001 | Hughes et al. | |
| 2002/0097874 A1 * | 7/2002 | Foden et al. | 380/256 |
| 2003/0112970 A1 | 6/2003 | Mitra | |

OTHER PUBLICATIONS

Koashi et al., Probabilistic Manipulation of Entangled Photons, 2001, The American Physical Society, pp. 1-4.*

Jennewein, Quantum Communication and Teleportation Experiments Using Entangled Photon Pairs, Jun. 11, 2002, Dissertation, pp. 1-141.*

Naik et al., Entangled State Quantum Cryptography: Eavesdropping on the Ekert Protocol, May 15, 2000, The American Physical Society, pp. 4733-4736.*

(Continued)

*Primary Examiner*—Kambiz Zand
*Assistant Examiner*—William S Powers
(74) *Attorney, Agent, or Firm*—Edward L. Stolarum; Lawrence E. Anderson (57) ABSTRACT

An apparatus for generating a shared quantum key between a sender and a receiver comprises a sending apparatus which generates entangled photon pairs, and a receiving apparatus. A shared quantum key can be generated using temporal coincidences between photon detection events. For example, coincidences may be determined between sender and receiver photon detection events using detection data shared through a non-secure communications link between the sender and receiver. The quantum key can be used in encrypted communications. Similar apparatus and methods can be used for quantum imaging.

33 Claims, 5 Drawing Sheets

OTHER PUBLICATIONS

Ribordy et al., Long-distance entanglement-based quantum key distribution, 2001, The American Physical Society, pp. 1-12.*
Walton et al., Performance of Photon-Pair Quantum Key Distribution Systems, 2001, pp. 1-6.*
Nasr et al., Biphoton focusing for two-photon excitation, Jan. 17, 2002, The American Physical Society, p. 1-6.*
"Quantum Cryptography," by N. Gisin, et al, Reviews of Mod. Phys. 74, 145-195 (2002).
"Quantum Cryptography Using Optical Fibers," by J.D. Franson, et al., Appl. Otp., 33, 2049-2954 (1994).
"Operational System for Quantum Cryptography," by J.D. Franson, et al., Elect. Lett. 31, 232-234 (1995).
"Quantum Cryptography in Free Space," by B.C. Jacobs, et al., Opt. Lett., 21, 1854-1856 (1996).
"Practical Quantum Key Distribution Over a 48 km Optical Fiber Network," by R.G. Hughes, et al., J. Mod. Opt. 47, 533-47 (2000).
"Free Space Quantum Distribution in Daylight," by R.G. Hughes, et al., J. Mod. Opt. 47, 549-562 (2000).
"Entangled State Quantum Cryptography: Eavesdropping on the Ekert Protocol," by D.S. Naik, et a., Phys. Rev. Lett., 84, 4733 (2000).
"One-Way Entangled-Photon Autocompensating Quantum Cryptography," by Z.D. Walton, Physical Review A., v. 67, 052309 (2003).
Secure Communication Using Mesoscopic Coherent States, by G.A. Barbosa, et al., Phys. Rev. Lett., 90, 227901 (2003).
"Tayloring Single and Multiphoton Probabilities of a Single Photon On-Demand Source," by A.L. Migdall, Phys. Rev. A., 66, 053805 (2002).
"Performance of Photon-Pair Quantum Key Distribution Systems," by Z. Walton, et al., J. Mod. Optics, 48, pp. 2055-2063 (2001).
"Degenerate Noncollinear Emission From a Type I Collinear Parametric Oscillator," by M.J. Shelton, et al., Optics Express, 9, pp. 16-22 (2001).
"Quantum cryptography using any two nonorthogonal states," by C.H. Bennett, Phys. Rev. Lett., 67, 3121 (1992).
"Purification of Noisy Entanglement and Faithful Teleportation via Noisy Channels," by C.H. Bennett, Phys. Rev. Lett., 76, No. 5, Jan. 29, 1996, pp. 722-5.
"Two-Photon Geometric Optical Imaging and Quantum 'CYPTO-Fax,'" by Y.H. Shih, et al., SPIE Proceedings, vol. 2799, pp. 164-171 (1996).
"Spatial Correlations of Spontaneously Down-Converted Photon Pairs Detected With a Single-Photon Sensitive CCD Camera," by B.M. Jost, Optics Express, 3, pp. 81-87 (1998).
"Biphoton Focusing for Two-Photon Excitation," by M.B. Nast, et al., Phys. Rev. A, 65, 023816-[1-5] (2002).
"Violations of Bell Inequalities by Photons More Than 10 km Apart," by W. Tittel, et al., Phys Rev. Lett., 81, pp. 3563-3566 (1998).
U.S. Appl. No. 60/456,871 to Elliott, et al. filed Mar. 21, 2003, entitled "Quantum Key Distribution Apparatus Based on Entangled Photons."
Artur K. Ekert, Quantum Cryptography Based on Bell's Theorem, Physical Review Letters, vol. 67, No. 6, Aug. 5, 1991.
J.D. Fransen, "Bell Inequality for Position and TIme," Physical Review Letters, vol. 62, No. 19, May 8, 1989.
N. Gisin, et al., "Quantum Cryptography and Long Distance Bell Experiments: How to Control Decoherence," University of Geneva, Geneva Switzerland, Jan. 15, 1999.
G. Ribordy, et al., "Long-Distance Entanglement-based Quantum Key Distribution," Physical Review A. vol. 63, 012309-12. Dec. 13, 2000.
D.S. Naik, "Entangled State Quantum Cruptography: Eavesdropping on the Ekert Protocol," Physical Review Letters, vol. 84, No. 20, pp. 4733-4736.
T. Jennewein, "Quantum Cryptography with Entangled Photons," Physical Review Letters, vol. 84, No. 20, pp. 4729-4732.
C. Elliott, "Buiilding the Quantum Network," New Journal of Physics 4, 46, Jul. 12, 2002.
G. Jaeger & A. Sergienko, "Multi-photon Quantum Inferometry," Progress in Optics 42, Chapter 5, pp. 277-324 (2001).
Award/Contract No. F30602-01-C-0170, Effective Date Aug. 10, 2001, Between Air Force Research Laboratory and BBNT Solutions LLC.

* cited by examiner

ENTANGLED QUANTUM COMMUNICATIONS AND QUANTUM IMAGING

REFERENCE TO RELATED APPLICATION

This application claims priority to provisional application U.S. Ser. No. 60/493,107, filed Aug. 6, 2003, the entire contents of which are incorporated herein by reference.

GOVERNMENT INTEREST

The invention described herein may be manufactured, used, and licensed by or for the United States Government.

FIELD OF THE INVENTION

The present invention relates to apparatus and methods for communications, in particular to encrypted communications.

BACKGROUND OF THE INVENTION

Quantum key distribution (QKD) endeavors to generate and distribute cryptographic keys using quantum physics in order to provide a higher level of security in communications than can be accomplished using classical means. There are significant challenges that must be overcome to accomplish this goal in practice.

One challenge common to QKD and other communication methods are the speed of the sender's laser modulation, speed of receiver's detectors, and reasonable assurance of having a single photon.

An eavesdropper may be near the sender, and may be able to electronically detect the modulated power drawn by the sender's lasers, or be able to read the pseudo-random number generator the sender uses to choose frames. The physical security of the sender and receiver is often overlooked. Other challenges may include power, cost, weight and robustness of operation.

SUMMARY OF THE INVENTION

An apparatus for generating a shared quantum key between a sender and a receiver comprises a sending apparatus which generates entangled photon pairs, and a receiving apparatus. A shared quantum key can be generated using temporal coincidences between photon detection events. For example, coincidences may be determined between sender and receiver photon detection events using detection data shared through a non-secure communications link between the sender and receiver. The quantum key can be used in encrypted communications. Similar apparatus and methods can be used for quantum imaging.

DETAILED DESCRIPTION

A number of optical systems are described below. Orientations of crystals (and of polarizations) are given relative to horizontal in the laboratory frame. However, other equivalent configurations will be apparent to those skilled in the arts.

Heralded Stochastic Quantum Key Distribution (HSQKD) System

Figure 1:
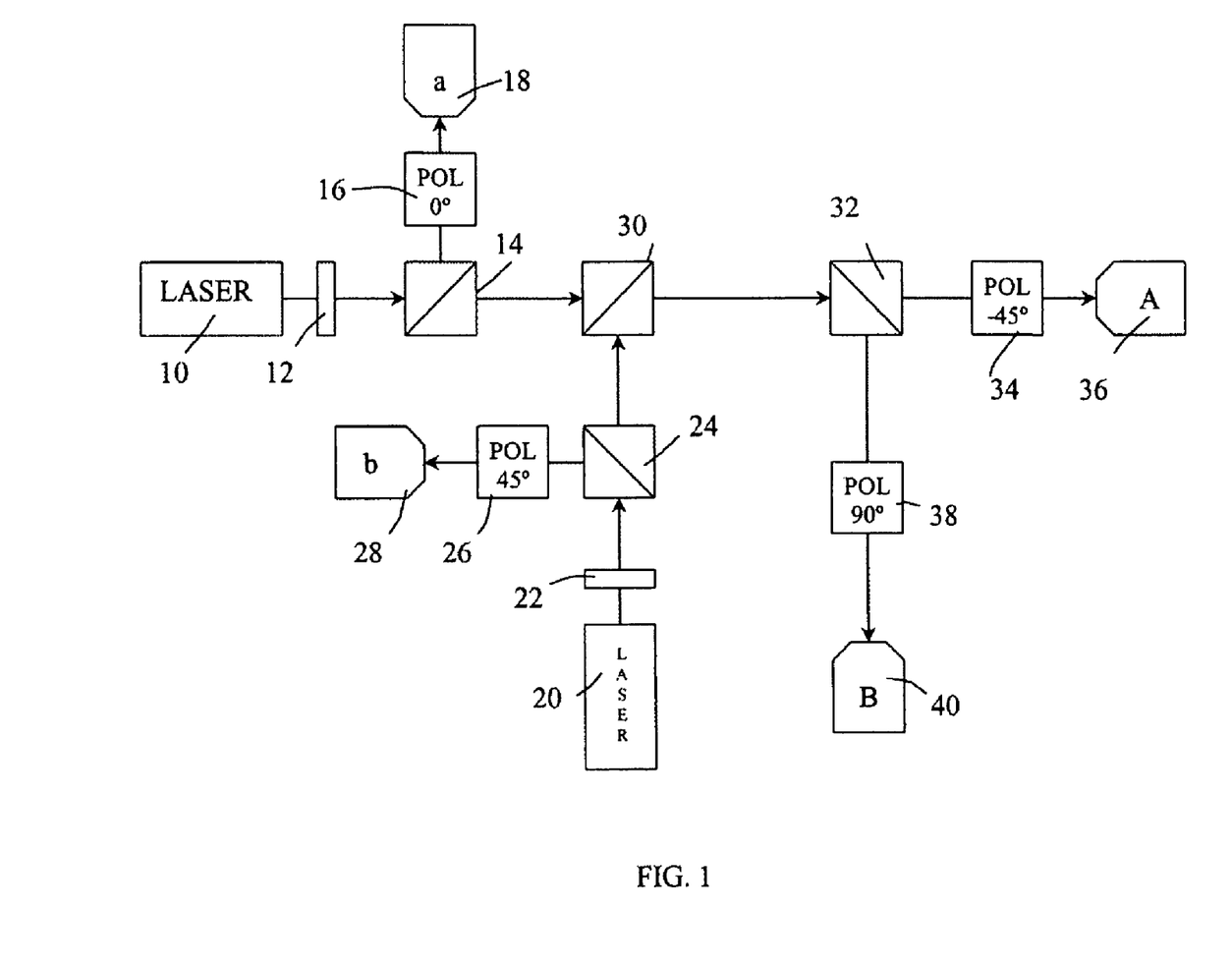
FIG. 1 is a schematic of a Heralded Stochastic Quantum Key Distribution (HSQKD) system.

FIG. 1 is a schematic of a HSQKD system, which includes a sending system and a receiving system. The sending system comprises a first laser 10, a first nonlinear crystal 12, a first beam-splitter 14, a first polarizer 16, a first detector 18, a second laser 20, a second nonlinear crystal 22, a second beam-splitter 24, a second polarizer 26, a second detector 28, and a beam recombiner 30. The receiving system (receiver) includes receiver beam-splitter 32, a first receiver polarizer 34, a first receiver detector 36, a second receiver polarizer 38, and a second receiver detector 40. The lines joining optical components show beam paths, the arrows indicate direction of the beams.

An optical system was constructed according to the schematic of FIG. 1, and is described in more detail below as an example. However, other operational configurations are possible, as will be clear to those skilled in the art.

The sending system has two input channels, a first input channel and a second input channel. The first input channel included the first laser 10, first nonlinear crystal 12 with an optical axis oriented at 0°, first beam-splitter 14 (a 50/50 beam-splitter), first polarizer 16 (with an optical axis at 0°), and first detector 18. The second input channel includes the second laser 20, second nonlinear crystal 22 with an optical axis oriented at +45°, second beam-splitter 24 (a 50/50 beam-splitter), second polarizer 26 (with an optical axis at +45°), and second detector 28.

The first and second lasers of the sending system were continuous wave (cw) diode lasers at $\lambda$ nm, and neutral density filters (not shown in FIG. 1) were used to reduce the intensity for photon counting. Any suitable laser can be used, such as solid state lasers, semiconductor lasers (such as red diode lasers), and the like.

The nonlinear crystals (12 and 22) were beta barium borate (BBO) crystals, provided in front of each laser to generate time entangled pairs of photons. The first nonlinear crystal 12 had an optic axis oriented at 0°, the second nonlinear crystal had an optic axis oriented at 45°. The nonlinear crystals were provided with appropriate angles to generate Type-I parametric fluorescence with degenerate wavelengths for signal and idler.

The crystals were cut and adjusted for Type-I phase matching conditions for collinear and degenerate parametric fluorescence of the symmetric energy state. Both energy states have the same polarization. In Type-I spontaneous parametric down-conversion, an incident photon is split into a pair of photons having equal energies.

The photon pairs generated by the first nonlinear crystal 12 were incident on the first beam-splitter 14. This was a 50/50 beam-splitter, so that photons had a 50/50 chance of progressing to the beam combiner 30 or being diverted through the first polarizer 16 to the first detector 16. Similarly, photon pairs generated by the second nonlinear crystal 22 arrive at the second beam-splitter 24, also a 50/50 beam-splitter, where they can be diverted to the second detector 28 or reach the beam converter 30.

The remaining photons (photons not directed to the first or second detectors) are recombined by the beam recombiner 30

(another 50/50 beam-splitter) into a single beam that is sent to the receiver. The beam was collimated at the sender side and projected a distance of over 10 feet to the receiver.

The receiver beam-splitter (32) divides the received photons into two paths, a first receiver channel (including first receiver detector 36), and a second receiver channel (including second receiver detector 40). The receiver beam-splitter (32) was a polarizing prism, with outputs oriented at 0° and +90°.

The first receiver polarizer 34, oriented at −45°, receives photons from the 0° side of the receiver beam-splitter 32. Hence, the beam in the first receiver channel passes through the first receiver polarizer (34), through the first receiver polarizer 34 (oriented at −45° to the horizontal), to the first receiver detector 36.

The photons in the second receiver channel passed through the second receiver polarizer, oriented at +90° to the horizontal, to the second receiver detector 40.

Signals are monitored for the four detectors (the first detector 18, second detector 28, third detector, and fourth detector, corresponding to photon polarizations of 0°, +45°, +90°, and −45°, respectively).

The detectors 18, 28, 36, and 40 are single photon counting modules (SPCMs), denoted a, b, A, and B respectively. Each detector is provided with, as accessories, a photon collector and a fiber optic link conveying photons incident on the photon collectors to electronic modules. Other configurations of single photon detectors can be used. Narrow band filters at the degenerate SPDC wavelength (2λ±10 nm) were used to protect the detectors. These filters are not shown in FIG. 1.

In another possible configuration, all of the beam-splitters in FIG. 1 can be 50/50 non-polarizing beam-splitters. In another possible configuration, the two receiver polarizers 16 and 26 can be omitted. The polarizers on the sender's side (16 and 26) are not required as the photons emitted by the non-linear crystals will have their orientation provided by the crystal. However, the sender's side polarizers can cut down the rate background error measurements.

Photon coincidences were counted using a time amplitude converter (ORTEC) and processed in a personal computer (PC). The PC processed the steps of the protocol that governs the generation of the quantum key.

Certain pairs of detection events are prohibited regardless of the quantum state. If the sender detects a photon with the first detector (polarization at 0°), then the second receiver detector can never detect a photon (polarization at +90°). If the sender detects a photon with the second detector (polarization at +45°), then the receiver cannot detect a photon with the second receiver detector (polarization at −45°).

The time interval during which a photon is either detected or not detected is typically about a nanosecond. For atmospheric transmissions, or other transmission where variability in ambient conditions may be present, a longer time interval, such as 2 or 4 nanoseconds can be used. In ideal conditions, the time interval could be reduced, for example to 0.1 ns.

There are several advantages over previous approaches. Unlike previous approaches, the only data exchanged between the sender and receiver are the times of photon detections. The sender and receiver can use synchronized clocks, exchange a timing pulse, or receive time information from a common clock.

Also, in this scheme, the sender is reasonably certain when a photon has been sent, as an entangled photon is detected at a detector on the sender's side. This considerably improved signal-to-noise ratios, compared with conventional methods where the sender has no such certainty that a photon has been sent. The combination of stochastic time-dependent variation (with no external modulation) and sender detection of one photon of an entangled pair provides great advantages over previous methods.

The laser wavelength used will depend on various factors, such as transparency windows in the medium used to convey photons between the sender and receiver. For example, fiber optic cable typically has good transmission properties around 1500 nm, so that a 750 nm laser could be chosen. The atmosphere has good transmission at yellow/green wavelengths, so if atmospheric transmission is desired a laser wavelength of about 250 nm could be used. The energy of the two entangled photons will add up to the energy of a laser photon. Typically, the two entangled photons will have half the energy (double the wavelength) of a laser photon. However, this need not necessarily be true, as discussed further below. There may be advantages in this scheme to having the transmitted photon be more or less than half the energy of the laser photon, for example to use a transparency window in the transmission medium in conjunction with a desired laser type and/or sender side detectors. Detector sensitivity may be another factor in wavelength choice.

Another advantage of this approach described above is that there is no external modulation. Modulation can cause power drain variations or radiation that can be detected by an eavesdropper. The modulation equipment also adds to the cost, complexity, and power requirement of the sending apparatus.

Stochastic Heralded QKD Protocol

A possible approach to stochastic heralded QKD is provided below. The sender and receiver both have synchronized clocks, or use a timing pulse, and their detectors can measure at most one photon in any time interval.

The following notations are used:
a=First detector (18), orientation 0°;
b=Second detector (28), orientation +45°;
A=First receiver detector (36), orientation −45°;
B=Second receiver detector (40), orientation +90°.

The sender at time $\tau_j$ (j=1, 2, 3, . . . ) detects a photon in one of these four cases:
(i) one at a but not at b, or
(ii) one at b but not at a, or
(iii) one at a and one at b, or
(iv) none at all.

The receiver at the same time rj detects a photon in one of these four cases:
(v) one at A but not at B, or
(vi) at B but not at A, or
(vii) one at A and one at B, or
(viii) none at all.

The sender discards all cases except (i) and (ii), and records only times $\tau_j(a)$ where case (i) occurred, and times $\tau_j(b)$ where case (ii) occurred.

The receiver discards all cases except (v) and (vi), and records only times $\tau_j(A)$ where case (v) occurred, and times $\tau_j(B)$ where case (vi) occurred. The receiver then sends a list of $\tau_j(A)$ and $\tau_j(B)$ to the sender by a classical channel.

The sender generates a list of times $\tau_j(c)$ where cases (i) and (v), or (ii) and (vi), occurred and sends the list to the receiver by a classical channel. The sender compares the list of $\tau_j(a)$ to the list of $\tau_j(a)$ and $\tau_j(b)$, and the receiver compares the list of $\tau_j(c)$ to the list of $\tau_j(A)$ and $\tau_j(B)$.

A quantum key is then assigned as follows. The $\tau_j(c)$ are sorted by time (if they weren't kept in order) and renumbered as $\tau_i(0)$ (i=1, 2, 3, 4, . . . ) where if i>i', then $\tau_i(0) > \tau_{i'}(0)$. If there is an m such that $\tau_m(0) = \tau_j(a) = \tau_j(A)$ for any j, a bit transformation $I_i$ is defined that leaves a bit unchanged.

A bit transformation function $K_i$ is defined as follows. If there is an m such that $\tau_m(0)=\tau_j(a)=\tau_j(A)$ for the j the bit value, $K_m$ is the identity operation that leaves the bit value unchanged. If there is an n such that $\tau_n(0)=\tau_j(b)=\tau_j(B)$ for any j, $K_n$ is the inverse operator that changes bit 0 to bit 1, and bit 1 to bit 0. The bit values of the encrypted message are in the variable $r_m$, and the bit values of the encrypted message is stored in the variable $s_i$.

The quantum key is in the form of two lists: one set of integers {m} for $K_m$ being the identity operation, and a set of integers {n} for $K_n$ being the inverse operation.

The sender's message is represented by the variable $s_i$ that can take on the bit values 0 or 1 for each i=1, 2, 3 . . . . The encrypted secret message or cipher is represented by variable $r_i = K_i(s_i)$. The message can be decrypted by performing the inverse operation $s_i = K_i(r_i)$.

The Heralded Stochastic Quantum Key Distribution scheme allows entanglement to be used to simplify both the optics and the electronics, while achieving security and speed. The protocol maintains secrecy and takes advantage of the photon stochasticity from parametric down-conversion crystals.

The quantum key for translating a secret message to an encrypted message, and for translating the encrypted message back to the secret message, is represented by an operator $K_i$ that acts on the $i^{th}$ bit value either with an identity or inverse operator.

The protocol for determining $K_i$ is summed up in Table 1 below. The background of signals that must be rejected depends on the two-photon quantum state that acts on the $i^{th}$ bit value either with an identity or inverse operator.

TABLE 1

| Sender/Receiver | A | B |
|---|---|---|
| a | Identity | Inverse |
| b | Inverse | Identity |

Table 1 shows $K_i$ operating on bit values (in $r_i$) of photons sent at a or b and photons received at A or B. $K_i$ provides the identity operation at aA and bB, and the inverse operation at aB and bA. The identity operator leaves the bit value unchanged, while the inverse operation changes bit 0 to bit 1 and bit 1 to bit 0.

The joint probabilities for both message and background are given in Table 2 for distinguishable particles, and Table 3 for indistinguishable particles.

TABLE 2

| First/Second | 0 | a | b | A | B |
|---|---|---|---|---|---|
| 0 | Noise | Noise | Noise | Noise | Noise |
| a | Noise | 1 | Ind | ¼ | 0 |
| b | Noise | Ind | 1 | 0 | ¼ |
| A | Noise | ¼ | 0 | NA | NA |
| B | Noise | 0 | ¼ | NA | NA |

Table 2 above is a joint probability table for the two-photon distinguishable state. Values in the table represent the conditional probability of detecting a second photon at a detector labeled in the row given that the first photon has already been detected at the detector labeled in the column. A probability of 0 is labeled either noise or not applicable (NA) and a probability of 0.5 (i.e., totally independent detections) is labeled Ind.

TABLE 3

| First/Second | 0 | a | b | A | B |
|---|---|---|---|---|---|
| 0 | Noise | Noise | Noise | Noise | Noise |
| a | Noise | 1 | Ind | ½ | 0 |
| b | Noise | Ind | 1 | 0 | ½ |
| A | Noise | ½ | 0 | NA | NA |
| B | Noise | 0 | ½ | NA | NA |

Table 3 above shows the joint probability table for the antisymmetric two-photon indistinguishable state. Values in the table represent the conditional probability of detecting a second photon at a detector labeled in the row given that the first photon has already been detected at the detector labeled in the column. A probability of 0 is labeled noise or not applicable (NA) and a probability of 0.5 (i.e., totally independent detections) is labeled Ind.

The method of heralded photons is different from the standard B92 protocol, in that it uses stochastic times, uses quantum fluctuations instead of the sender's choice of frames, and can use continuous wave lasers.

The method of heralded photons is as secure against eavesdroppers as the B92 protocol. It is secure against some challenges to the physical security of the sender. However, the algorithms for generating and distributing a quantum key may be more complex than the standard B92 protocol. Also, the elimination the use of software-driven random number generators, along with the elimination of the signature of laser modulating electronic equipment, increases the security of communication.

Energy Entangled Stochastic Quantum Key Distribution (ENESQKD)

Figure 2:
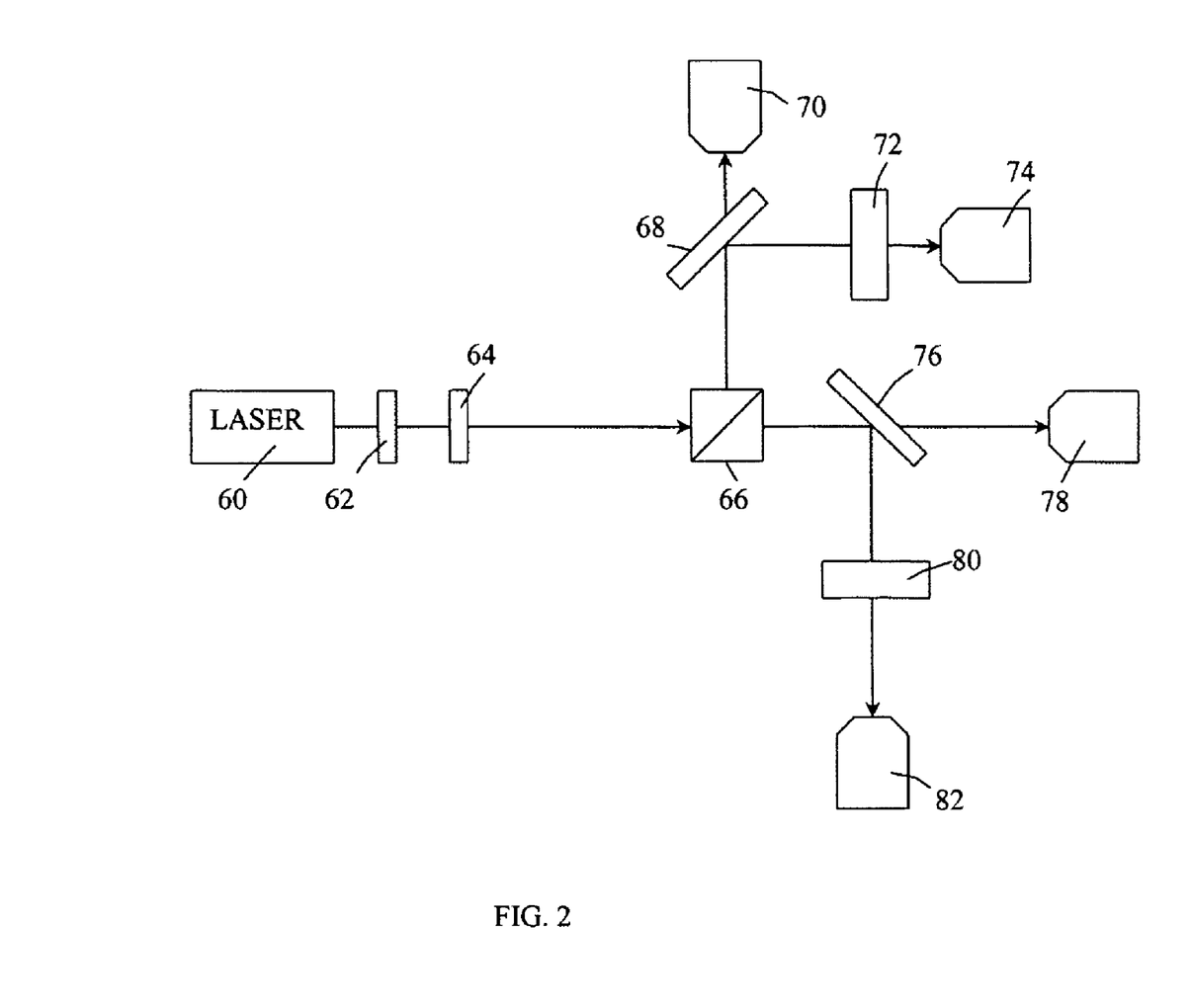
FIG. 2 is a schematic of an Energy Entangled Stochastic Quantum Key Distribution (ENESQKD) system.

FIG. 2 is a schematic of an Energy Entangled Stochastic Quantum Key Distribution (ENESQKD) system. In this system, energy filters are used to transmit or reflect the conjugate entangled energies in a manner that is similar to polarization in other systems described elsewhere in this specification.

The sending system comprises a laser 60, nonlinear crystal 62, attenuation filter 64, and beam-splitter 66. Signals are sent to two receivers. The first detection system includes first dichroic mirror 68, first detector 70, first optical filter 72, and second detector 74. The second detection system includes second dichroic mirror 76, third detector 78, second optical filter 80, and fourth detector 82.

The EnESQKD sending system generates nearly collinear energy entangled photons. The Type I non-linear crystal 62 generates a pair of Type I SPDC photons, which are incident on the 50/50 (non-polarizing) beam-splitter 66, and directed to either the first detection system or to the second detection system.

Photons directed to the first detection system are incident on the first dichroic mirror 68. Photons transmitted by the first dichroic mirror 68 are then incident on the first detector 70. Photons reflected by the first dichroic mirror 68, and which are transmitted by the first optical filter 72, are incident on the second director 74. Photons directed to the second detection system may be detected by the third detector 78 or fourth detector 82, by analogous processes. The detectors can be single photon counting modules (SPCMs), as described above in relation to FIG. 1, though other photon counting detectors can be used.

The two detection systems use dichroic mirrors and narrow-band optical filters to aid in the generation of shared quantum keys. This approach uses photon energy, not polarization, to generate a shared quantum key. This approach may not be theoretically secure in all applications, but can be secure in practice.

The nonlinear crystal and laser are configured to produce entangled pairs of photons, the entangled photons having different energies. The energy of each photon of an entangled pair need not be the same, even though the total energy sums to the energy of a laser photon. Using known laser and nonlinear crystal geometries, an entangled pairs of photons are created, the photons having a different energy.

In examples of this system, the first detection system is in possession of the remote receiver, and the second detection system is in possession of the sender. Detection time data can be shared as described above in relation to FIG. 1, and analogous methods used to generate a shared key. As in the system described above in relation to FIG. 1, the sender generates an entangled photon pair, sends one of the entangled pair to the receiver, and detects the other photon of the entangled pair.

The following example is provided for illustration. If the laser photon wavelength can be 400 nm, the wavelength of one photon of the entangled pair can be 780 nm, and the other entangled photon wavelength can be 820 nm. In this example, the first dichroic mirror transmits 780 nm photons, and reflect other photon energies. Transmission bandwidths should be less than the photon energy difference. The first optical filter transmits 820 nm photons, and rejects others. The second dichroic mirror transmits at 820 nm, the second optical filter transmits at 780 nm.

If the first detection system detects an 820 nm photon (reflected by the first dichroic mirror and transmitted by the first optical filter), and the second detection system detects a 780 nm photon (reflected by the second dichroic mirror and transmitted by the second optical filter), a bit value of 1 is assigned. In this case, both photons are reflected by the dichroic mirrors, and pass through the optical filters (72 and 80) to the detectors (74 and 82). If both photons are transmitted by the dichroic mirrors (i.e. are transmitted to detectors 70 and 78), a bit value of 0 is assigned.

As with the system described above in relation to FIG. 1, photon detection coincidences are defined as detection events within a predetermined time interval, such as 1 nanosecond.

Numerous other examples will be obvious to those skilled in the art. For example, the definitions of bit 1 and bit 0 can be reversed, other photon wavelengths can be used, and the like.

The stochastic energy based entanglement technique in not theoretically resistant to eavesdropping on shared quantum keys because of the possibility of cloning, i.e. copying a signal photon without destroying it. However, in practice it is difficult to eavesdrop on because of timing constraints. This method can be used to generate shared random keys in an environment where eavesdropping is not a threat.

Entanglement Enhanced Stochastic Quantum Key Distribution (EESQKD) System

Figure 3:
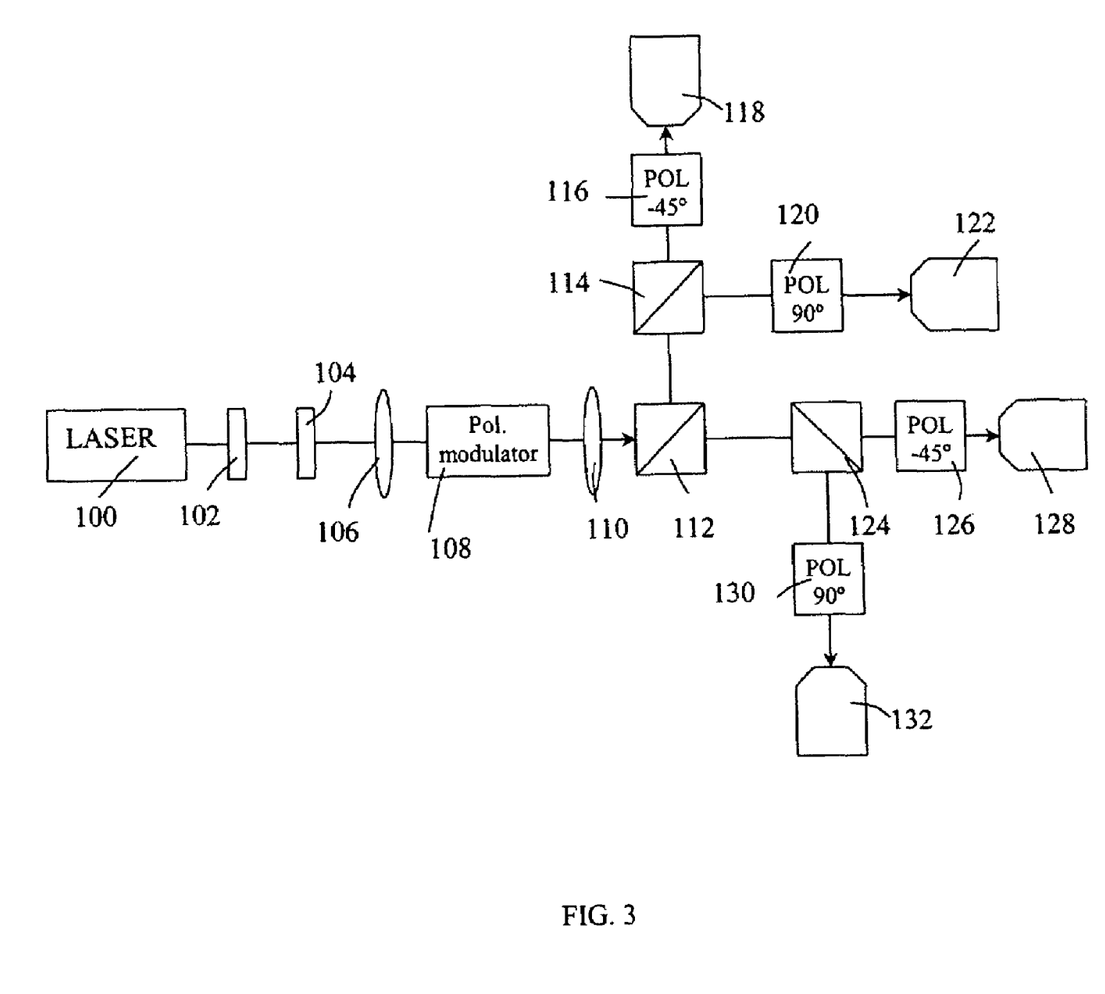
FIG. 3 is a schematic of the Entanglement Enhanced Stochastic Quantum Key Distribution (EESQKD) system.

FIG. 3 is a schematic of an EESQKD system, which uses entanglement to increase the ratio of detected and counted photons over that of background detected and counted photons. This system uses polarization modulation, unlike other systems described which use stochastic (random) time dependent effects.

The sending system comprises a laser 100, nonlinear crystal 102, attenuation filter 104, first lens 106, polarization modulator 108, second lens 110, and beam-splitter 112. The attenuation filter and lenses are optional. The beam-splitter 112 is a 50/50 beam-splitter.

The remote receiver is in possession of a first detection system and a second detection system. The first detection system includes a first receiver beam-splitter 114, first polarizer 116, first detector 118, second polarizer 120, and second detector 122. The second detection system includes a second receiver beam-splitter 124, third polarizer 126, third detector 128, fourth polarizer 130, and fourth detector 132.

Entangled photon pairs are incident on the first receiver beam-splitter, a non-polarizing beam-splitter. Each photon pair consists of a first photon and a second photon, the first photon being directed to the first detection system, the second photon being directed to the second detection system. The first and second receiver beamsplitters can be polarizing beamsplitters, with output polarizations consistent with the polarizer configuration used.

Photons directed to the first detection system can be detected by the first detector 118, at a polarization of −45° as defined by the first polarizer, and at the second detector 122 at a polarization of 90°, as defined by the second polarizer 120. The second detection system operates in a similar pattern, with photons being detected at −45° or 90°.

When the entangled photons arrive at the remote receiver, detection coincidences determine that the photons are from the sender, rather than being stray photons. Hence, signal enhancement is provided by the coincidence measurements. Here, the coincidences detected are between the first detector and the third detector (the two −45° detectors, 118 and 128), or the second detector and the fourth detector (two 90° detectors, 122 and 132), i.e. detection of photon pairs having the same polarization. Coincidental detections can then be used to generate an encryption key.

Detections can also be correlated with the settings of the polarization modulator, in possession of the sender, using transmissions over a public channel. The detectors used can be single photon counting modules (SPCMs), as described above in relation to FIG. 1, though other photon counting detectors can be used.

The nonlinear crystal 102 is a type-I crystal. The polarization modulator sets the polarization state of the Type-I SPDC photons. Typically, two polarization states are used, separated by 45°. Using this approach, there is some cost in overall throughput.

In other examples, nearly collinear energy entangled photons released in a stochastic unmodulated form can be sent by the sender to the receiver using two laser sources. The polarizers are set up in a manner consistent with the B92 protocols.

An EESQKD system (and also an HSQKD system) can be used in multiple configurations, including the use of coincidence timing, and the use of timing pulses for gating.

Quantum Imaging Encoded Quantum Imaging System

Figure 4:
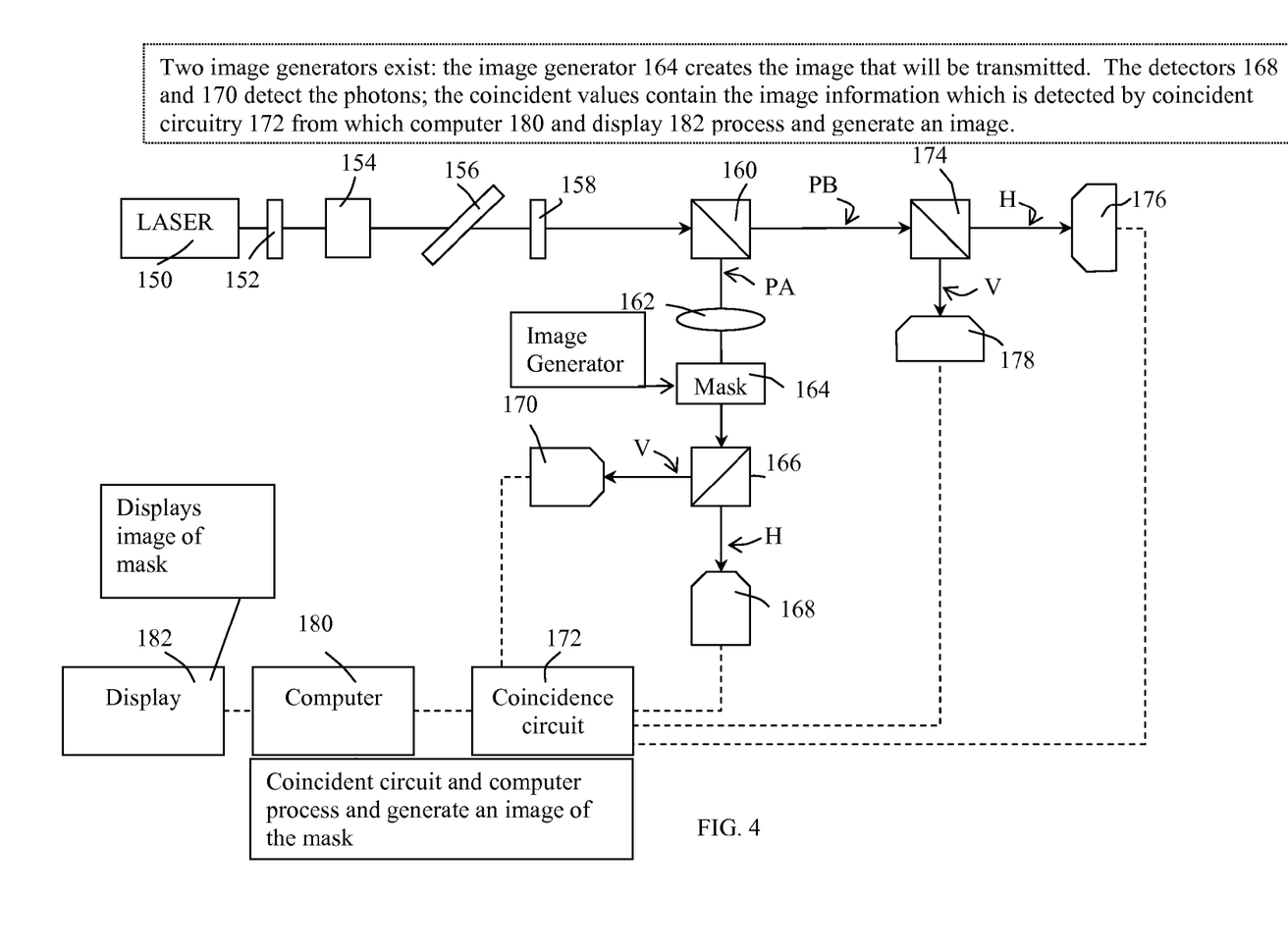
FIG. 4 is a schematic of an Encoded Quantum Imaging system.

FIG. 4 is a schematic of an Encoded Quantum Imaging system. The quantum imaging system shown in FIG. 4 provides for the imaging of the image mask using entangled photons and coincidence measurements. The sender sends the image of an image mask to the receiver. The system is different from a conventional quantum imaging setup in that polarizing beam-splitters are placed in the path of the photons to provide two channels for each of the sender and receiver of the images.

The system includes a laser 150, nonlinear crystal 152, collimator 154, mirror to remove fundamental 156, narrow-band filter 158, beam-splitter 160, image lens 162, image mask 164, sender's polarizing beam-splitter 166, first photon detector 168, second photon detector 170, coincidence circuit 172, receiver polarizing beam-splitter 174, first scanning fiber tip detector 176, second scanning fiber tip detector 178, computer 180, and image display 182. Dashed lines indicate electronic control, trigger, and detection cabling.

The nonlinear crystal 152 is a type II crystal, producing entangled photons having orthogonal polarizations. The beam-splitter 160 is a 50/50 beam-splitter. The beam-splitter 160 directs photons to a polarizing beam-splitter on the sender's side (166), which directs horizontally polarized photons (denoted H) to the first photon detector 168, and vertically polarized photons (denoted V) to the second photon detector 170.

The beam-splitter 160 directs photons to a polarizing beam-splitter on the receiver's side (174), which directs horizontally polarized photons (denoted H) to the first scanning fiber tip detector 176, and vertically polarized photons (denoted V) to the second scanning fiber tip detector 178.

In the figure, the path for photons on side of the sender is denoted PA, and the path on side of the receiver is denoted PB. The receiver receives the image entirely from the photon coincidence measurements composited from the two scanning fiber tips in front of detectors. Fast single photon CCDs can be used in place of the scanning fiber tips 176 and/or 178.

The image mask to be transmitted is within the sending system. The receiver receives the image through coincidence measurements. The first scanning and second scanning fiber tip detectors scan through the received signal, for example under control of the computer 180, and coincidences are established by the coincidence circuit 172.

Hence, the image is transmitted directly through coincidence measurements, and the photons transmitting the image information in path PB have never encountered the image mask.

A stochastic quantum key can also be generated between the sender and receiver, for example based on detection of a predetermined coincidence. In one example, a PAV+PBH coincidence (sender detects a vertically polarized photon, receiver detects a horizontally polarized photon) can be a bit 0, and a PAH+PBV (sender detects a horizontally polarized photon, receiver detects a vertically polarized photon) can be a bit 1. This may be alternatively denoted HV=1, VH=0. Hence, a stochastic quantum key can be transmitted by predetermined coincidence measurements, of which other examples will be apparent.

The standard types of privacy amplification and key distillation algorithms can then be applied to this random shared bitstream. The embedding of this type of quantum key into quantum image transmission can provide a system for quantum steganography.

Quantum Channel Only Entanglement Imaging

Figure 5:
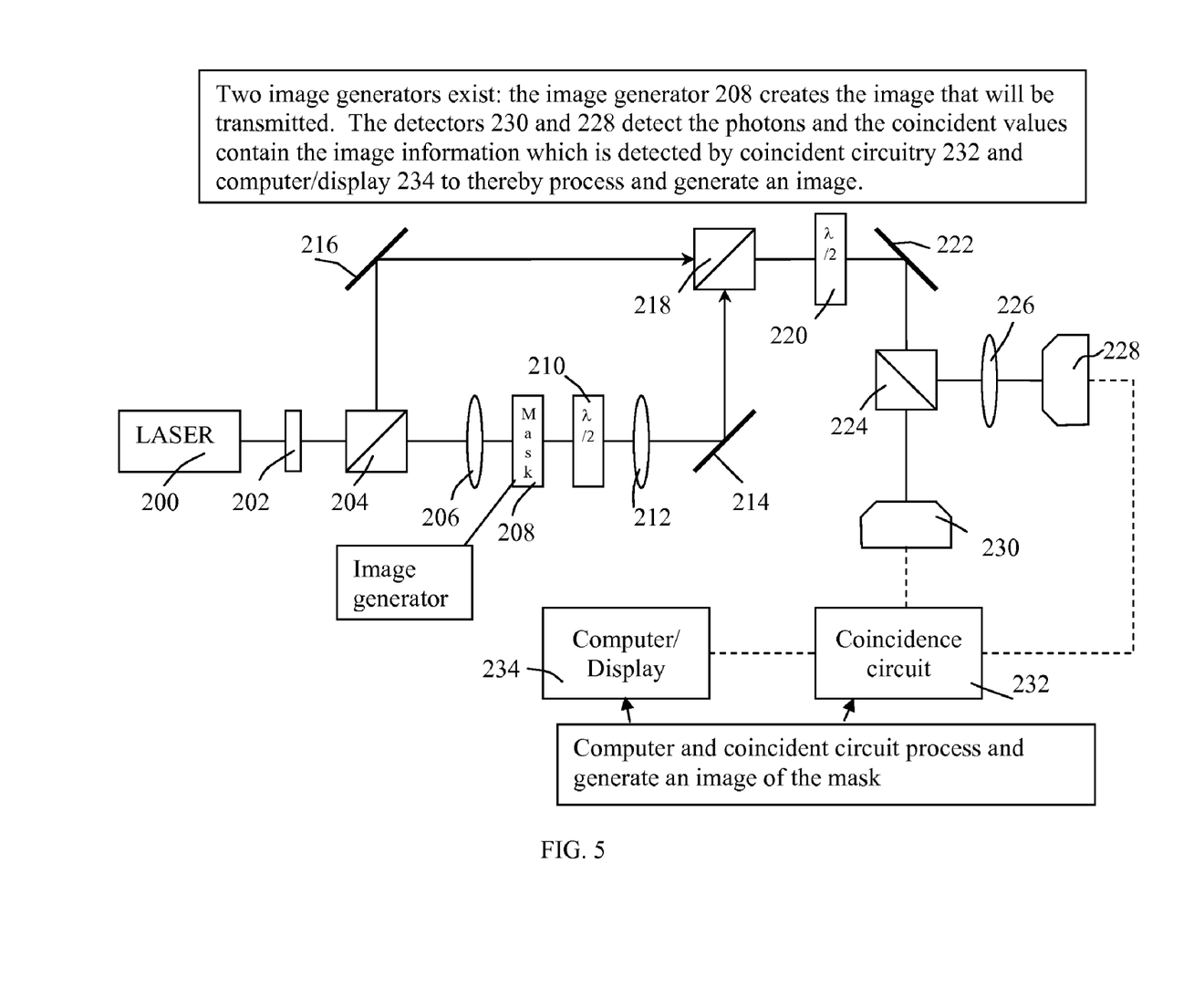
FIG. 5 is a schematic of Quantum Channel Only Entanglement Imaging system.

FIG. 5 is a schematic of Quantum Channel Only Entanglement Imaging system. The system includes a laser 200, nonlinear crystal 202, first beam-splitter 204, first lens 206, image mask 208, first half-wave plate 210, second lens 212, first reflector 214, second reflector 216, beam recombiner 218, second half wave plate 220, third mirror 222, second beam-splitter 224, focusing optics 226, single photon detector 228, scanning fiber tip photon detector 228, coincidence circuit 232, and computer with display 234.

The nonlinear crystal is a type I crystal with 0° polarization. A type II crystal could also be used, with suitable system modifications. The first and second beam-splitters (218 and 224) are 50/50 beam-splitters. The beam recombiner 218 is a polarizing beam-splitter. The first half-wave plate 210 rotates the polarization of photons from 0° to 90°, this allows reflection at the beam recombiner 218. The second half-wave plate 220 rotates polarization +/−45°. This reduces the potential for eavesdropping. Without the second half-wave plate, an eavesdropper could insert a polarizing beamsplitter into the transmitted beam to separate out photons that had transmitted through the mask.

The system uses properties of entangled imaging to transmit an image. If an eavesdropper attempts to intercept photons between sender and receiver, only single photons will be intercepted, and the receiver will detect the loss of single and coincidence counts.

This system provides a means of transmitting an image using only a quantum channel. There is no classical channel between the sender and the receiver. This layout differs from earlier systems (such as Y. H. Shih, et al., "Two-Photon Geometric Optical Imaging and Quantum 'CryptoFAX'", *Proc. SPIE,* 2799, pp. 164-171 (1996); B. M. Jost, et al., "Spatial correlations of spontaneously down-converted photon pairs detected with a single-photon-sensitive CCD camera", *Optics Express,* 3, pp. 81-87 (1998)) in that instead of a classical and a quantum channel being used to send the information of the image, only a quantum channel is used in this system.

In certain examples discussed above, either Type I nonlinear crystals (for entangled photons having parallel polarizations) or Type II nonlinear crystals (for entangled photons having orthogonal polarizations) were specified. However, it will be obvious to those skilled in the art where the other type of non-linear crystal may be used, with other suitable system modifications.

Patents, provisional patent applications, or publications mentioned in this specification are herein incorporated by reference to the same extent as if each individual publication was specifically and individually indicated to be incorporated by reference. In particular, provisional application 60/493, 107, filed Aug. 6, 2003, is incorporated herein in its entirety.

The invention is not restricted to the illustrative examples described above. Examples are not intended as limitations on the scope of the invention. Changes therein, other combinations of elements, and other uses will occur to those skilled in the art.

The scope of the invention is defined by the scope of the claims.

Having described our invention, we claim:

1. An apparatus for generating a shared quantum key between a sender and a receiver, the apparatus comprising a sending apparatus and a receiving apparatus, the sending apparatus stochastically generating entangled photon pairs, the sending apparatus detecting a first photon of each entangled photon pair and transmitting a second photon of each entangled photon pair to the receiving apparatus, the receiving apparatus detecting the second photon of each entangled pair, the sending apparatus and the receiving apparatus being in communication through a communication link, the shared quantum key being generated from stochastic temporal coincidences between sender photon detection data and receiver photon detection data shared over the communication link.

2. The apparatus of claim 1, wherein the stochastically generated entangled photon pairs that the sending apparatus generates are split into first and second entangled photon beams, the first entangled photon beam being retained by the sender and being comprised of photons having a first polarization, the second entangled photon beam being sent to the receiver and being comprised of photons having a second polarization, the sender photon detection data and receiver photon detection data including timing information correlated with detected photon polarization, and wherein the shared quantum key is derived from comparison of the sender and receiver data for instances when the first polarization is the conjugate of the second polarization at corresponding times.

3. The apparatus of claim 1, wherein the first photons have a first energy, the second photons have a second energy, the first energy being greater than the second energy, and further including filters which act as dichroic mirrors to pass photons with an energy interval encompassing said first energy and said second energy while excluding photon energies outside the energy interval, and the sender photon detection data and receiver photon detection data including information correlated with detected photon energy.

4. The apparatus of claim 2, wherein the first polarization and the second polarization are the conjugates of one another that have an angular difference of 90 degrees.

5. The apparatus of claim 1, wherein the the stochastically generated entangled photon pairs that the sending apparatus generates are split into first and second entangled photon beams, the first entangled photon beam being directed to the sender and being comprised of photons having a first polarization, the second entangled photon beam being sent to the receiver and being comprised of photons having a second polarization, the sender photon detection data and receiver photon detection data including timing information correlated with detected photon polarization, and wherein the shared quantum key is a sequence of bits derived from a comparison of the sender and receiver data for instances when the first polarization is the conjugate of the second polarization at a corresponding time; and wherein for each instance when the first polarization is the conjugate of the second polarization at a corresponding time the first polarization may have only first or second characteristics; and wherein
   (a) if the first polarization has the first characteristic then a zero is selected for a predetermined bit position in the shared quantum key sequence of bits;
   (b) if the first polarization has the second characteristic, then a one is selected for a predetermined position in the shared quantum key sequence of bits.

6. The apparatus of claim 5 wherein the first polarization characteristic is the angle of polarization.

7. The apparatus of claim 6, wherein the first polarization is 0 degrees, and the second polarization is 90 degrees, polarizations being angularly determined from a common plane.

8. The apparatus of claim 1, wherein the sending apparatus generates time-random photon pairs, to thereby eliminate the need for a modulation device.

9. The apparatus of claim 2, wherein the first and second entangled photon beams are provided using a laser, and a nonlinear crystal.

10. A sending apparatus in possession of a sender for enabling an encryption key to be shared between the sender and a receiver, the sending apparatus comprising:
   a source of entangled photon pairs generated at stochastic times to form an entangled photon beam that is unmodulated and stochastic;
   a first beamsplitter;
   a first detector; and
   a communications link, providing communication with the receiver,
   the entangled photon beam being incident on the first beamsplitter, the first beamsplitter operational to split at least part of the entangled photon beam into a directed beam and a transmitted beam, the directed beam being incident on the detector and the transmitted beam being sent to the receiver,
   the first detector providing detector data correlated with detection of photons in the directed beam, the detector data including time of detection data, the detector data being transmittable to the receiver over the communications link,
   whereby the transmitted beam and detector data can be sent to the receiver, the receiver then generating the encryption key using stochastic temporal coincidences determined between detector data received by the receiver, and receiver detection data determined from the transmitted beam.

11. The apparatus of claim 10, wherein the source of entangled photon pairs provides entangled photon pairs with each of one of the pair being mutually interdependent on the other such that for each generated entangled photon pair, the plane of polarization of one of the pair depends on that of the other, the polarization of the first photon of the pair being detected by the detector and the polarization of the second photon of said photon pair adapted to be detected by the receiver.

12. The apparatus of claim 10, wherein the source of entangled photon pairs comprises a laser and a nonlinear crystal.

13. The apparatus of claim 10, wherein the detector is a photon counting detector.

14. The apparatus of claim 10, wherein the apparatus further comprises a receiver apparatus in possession of the receiver, the receiver apparatus comprising:
   a receiver beamsplitter;
   a first receiver detector; and
   a second receiver detector,
   the receiver beamsplitter splitting at least part of the transmitted beam received from the sender into a first receiver beam and a second receiver beam, the first receiver beam being incident on the first receiver detector and the second receiver beam being incident on the second receiver detector,
   the receiver determining time-dependent coincidences between the receiver data obtained from the first receiver detector and the second receiver detector and the detector data received from the sender.

15. The apparatus of claim 10, further comprising a second beamsplitter and a second detector, and wherein the
   source of entangled photons comprises a first source of entangled photons providing a first entangled photon beam; and
   a second source of entangled photons providing a second entangled photon beam;
   the first entangled photon beam being incident on the first beamsplitter, the first beamsplitter operational to split at least part of the first entangled photon beam into a first directed beam and a first transmitted beam, the directed beam being incident on the detector, the second entangled photon beam being incident on the second beamsplitter, the second beamsplitter operational to split at least part of the second entangled photon beam into a second directed beam and a second transmitted beam, the second directed beam being incident on the second detector,
   the first detector providing first detector data correlated with detection of photons in the first directed beam,
   the second detector providing second detector data correlated with detection of photons in the second directed beam, the first detector data and second detector data being combined in the detector data being transmittable to the receiver over the communications link, the first transmitted beam and the second transmitted beam being combined into the transmitted beam being sent to the receiver.

16. The apparatus of claim 10, wherein the the directed beam is comprised of photons having a first polarization, the transmitted beam is comprised of photons having a second polarization, the detector and the receiver detection data including timing information correlated with detected photon polarization, and wherein the shared quantum key is a sequence of bits derived from a comparison of the detector and receiver detection data for instances when the first polarization is the conjugate of the second polarization at a corresponding time; and wherein for each instance when the first polarization is the conjugate of the second polarization at a corresponding time the first polarization has either first or second characteristics; and wherein (c) if the first polarization has the first characteristic then a zero is selected for a predetermined bit position in the shared quantum key sequence of bits;

(d) if the first polarization has the second characteristic, then a one is selected for a predetermined position in the shared quantum key sequence of bits.

17. The apparatus of claim 10, the sending apparatus further including an image generator upon which at least a portion of the directed beam illuminates, the apparatus being further operable to transmit encrypted image data.

18. The apparatus of claim 17, wherein the source of entangled photons includes a laser and a type II nonlinear crystal, the directed beam being incident on the image generator, the directed beam subsequently being split by a polarizing beamsplitter into a first split beam and a second split beam, the first split beam being incident on a first detector, the second split beam being incident on a second detector, the detector data being transmittable to the receiver over the communications link including first detector data from the first detector and second detector data from the second detector.

19. A method of generating a quantum key for encrypted communication between a sender at a sender location and a receiver at a receiver location, the method comprising:

splitting a stochastic, unmodulated entangled photon beam into a directed beam and a transmitted beam at the sender location;

determining sender data relating to the directed beam at the sender location, the sender data including sender time-dependent photon detection data;

transmitting the transmitted beam to the receiver;

determining receiver data relating to the transmitted beam at the receiver location, the receiver data including receiver time-dependent photon detection data; and generating the encryption key through an exchange of sender data and receiver data through a communication link between the sender location and the receiver location.

20. The method of claim 19, wherein the entangled photon beam comprises entangled photon pairs with each of one of the pair being mutually interdependent on the other such that for each generated entangled proton pair the plane of polarization of one of the pair depends on that of the other, the first photon of the pair being part of the directed beam and the second photon of said photon pair being part of the transmitted beam.

21. The method of claim 19, wherein the directed beam is comprised of photons having a first polarization, the transmitted beam is comprised of photons having a second polarization, the sender data and receiver data including timing information correlated with detected photon polarization, and wherein the shared quantum key is a sequence of bits derived from a comparison of the sender and receiver data for instances when the first polarization is the conjugate of the second polarization at a corresponding time; and wherein for each instance when the first polarization is the conjugate of the second polarization at a corresponding time the first polarization may have only first or second characteristics; and wherein (a) if the first polarization has the first characteristic then a zero is selected for a predetermined bit position in the shared quantum key sequence of bits;

(b) if the first polarization has the second characteristic, then a one is selected.

22. The method of claim 19, wherein the transmitted beam is split into a first receiver beam and a second receiver beam at the receiver location, the receiver data relating to the first receiver beam and the second receiver beam.

23. The method of claim 19, wherein a second entangled photon beam is split into a second directed beam and a second transmitted beam at the sender location, the sender data relating to the directed beam and the second directed beam, the second transmitted beam being combined with the transmitted beam, both being sent to the receiver.

24. An apparatus for facilitating the generation of a quantum key to be shared between a sender and a receiver, the apparatus comprising:

a sending apparatus, including a first source of entangled photons, providing a first entangled beam absent modulation, a second source of entangled photons, providing a second entangled beam absent modulation, a first beamsplitter, a first detector, a second beamsplitter, and a second detector, the first entangled beam being incident on the first beamsplitter, the first beamsplitter producing a first directed beam incident on the first detector and a first transmitted beam transmitted to the receiver, the second entangled beam being incident on the second beamsplitter, the second beamsplitter producing a second directed beam incident on the second detector and a second transmitted beam transmitted to the receiver;

a receiving apparatus, including a first receiving beamsplitter, a first receiver detector, and a second receiver detector;

sender detector electronics, operable to provide sender data, the sender data including sender single photon detection data from the first detector and the second detector during predetermined time intervals;

receiver detector electronics, operable to provide receiver data, the receiver data including receiver single photon detection data from the first receiver detector and the second receiver detector during the predetermined time intervals; and a communications link between the sender and the receiver, through which sender data and receiver data can be exchanged.

25. The apparatus of claim 24, wherein:

the first source of entangled photons includes a first laser and a first nonlinear crystal of Type I nonlinearity, the second source of entangled photons includes a second laser and a second nonlinear crystal of Type I nonlinearity, the first entangled beam having a first polarization, the second entangled beam having a second polarization.

26. The apparatus of claim 25, wherein the first polarization is at an angle of zero degrees, the second polarization is at an angle of 45 degrees, the first receiver detector is responsive to photons polarized at −45 degrees, and the second receiver detector is responsive to photons polarized at 90 degrees, polarizations being angularly determined from a common plane.

27. The apparatus of claim 24, wherein the communications link between the sender and the receiver is a public communications link.

28. The apparatus of claim 24, further comprising coincidence detection electronics at the receiver, the coincidence detection electronics receiving sender data and receiver data.

29. A sending apparatus for transmitting encoded image data from a sender to a receiver, the sending apparatus comprising:

a source of entangled photons providing an entangled beam, and a first beamsplitter, an image generator, a second beamsplitter, a first detector, and a second detector, the entangled beam being incident on the first beamsplitter, the beamsplitter providing a directed beam and a transmitted beam, the transmitted beam being sent to the receiver, the directed beam being incident on the image generator such that portions of the directed beam are reflected by the image generator and portions of the directed light are transmitted to the second beamsplitter, the second beamsplitter providing two orthogonally polarized beams incident on the first and second detectors respectively, a communications link with the remote apparatus, through which detection time data can be transmitted, whereby the receiver can receive the transmitted beam and the detection time data related to the directed beam, the receiver being able to decode the transmitted encoded image data using coincidence measurements between receiver detection data generated by the receiver and detection data received from the sending apparatus.

30. An apparatus for image transmission from a sender to a receiver, the apparatus comprising:

a sending apparatus, including:

a source of entangled photons providing an entangled beam, a beamsplitter, an image generator, and a beam recombiner, the entangled beam being incident on the beamsplitter, the beamsplitter providing a first beam which illuminates the image generator, and a second beam which does not interact with the image generator, the beam recombiner combining the first beam and the second beam into a transmitted beam sent to the receiving apparatus; and a receiving apparatus, including:

a receiver beamsplitter, a first receiver detector, providing first receiver data, a second receiver detector, providing second receiver data, and a coincidence circuit, the transmitted beam being incident on the receiver beamsplitter, the receiver beamsplitter providing a first receiver beam incident on the first receiver detector, and a second receiver beam incident on the second receiver detector, the coincidence circuit receiving the first receiver data and the second receiver data, and reconstructing the image from determined coincidences between the first receiver data and the second receiver data.

31. The apparatus of claim 30, wherein the first receiver data and the second receiver data including single photon counting data obtained during synchronized time intervals.

32. The apparatus of claim 30, wherein the image is transmitted utilizing encoded image data using coincidence measurements between receiver detection data generated by the receiver and detection data received from the sending apparatus.

33. The apparatus of claim 31, wherein the image is transmitted utilizing encoded image data using coincidence measurements between receiver detection data generated by the receiver and detection data received from the sending apparatus.

* * * * *